US007896561B2

(12) United States Patent
Takahashi et al.

(10) Patent No.: US 7,896,561 B2
(45) Date of Patent: Mar. 1, 2011

(54) FOCAL PLANE SHUTTER (75) Inventors: Hiroshi Takahashi, Chiba (JP); Chiaki Nemoto, Chiba (JP)

(73) Assignee: Seiko Precision, Inc., Narashino-shi (JP)

( * ) Notice: Subject to any disclaimer, the term of this patent is extended or adjusted under 35 U.S.C. 154(b) by 0 days.

(21) Appl. No.: 12/549,734

(22) Filed: Aug. 28, 2009

(65) Prior Publication Data
US 2009/0317072 A1 Dec. 24, 2009

Related U.S. Application Data (63) Continuation of application No. PCT/JP2008/066540, filed on Sep. 12, 2008.

(30) Foreign Application Priority Data
Nov. 12, 2007 (JP) .............................. 2007-293758

(51) Int. Cl.
*G03B 9/40* (2006.01)
(52) U.S. Cl. ..................................... 396/489
(58) Field of Classification Search ................. 396/456, 396/483, 484, 502, 489; 75/575; 74/148, 74/576
See application file for complete search history.

(56) References Cited

U.S. PATENT DOCUMENTS 4,110,772 A * 8/1978 Nakagawa et al. .......... 396/456
4,401,006 A * 8/1983 Sekiguchi ................... 84/95.1
4,963,908 A * 10/1990 Toyoda et al. ............... 396/486
5,835,805 A * 11/1998 Izaki et al. .................. 396/411
5,903,784 A * 5/1999 Hori ........................... 396/277
7,404,344 B2 * 7/2008 Erdloff ........................ 74/575
2007/0253707 A1 * 11/2007 Yoshida et al. .............. 396/489

FOREIGN PATENT DOCUMENTS

| JP | 2002-296641 A1 | 10/2002 |
| JP | 2003-66508 A1 | 3/2003 |
| JP | 2007-2891 A1 | 1/2007 |
| JP | 2007-292101 A1 | 11/2007 |

OTHER PUBLICATIONS

International Search Report for International Application No. PCT/JP2008/066540 dated Nov. 4, 2008.

* cited by examiner

*Primary Examiner*—Clayton E LaBalle
*Assistant Examiner*—Leon W. Rhodes
(74) *Attorney, Agent, or Firm*—Kratz, Quintos & Hanson, LLP (57) ABSTRACT A focal plane shutter includes: a shutter substrate having an opening; a blade for opening and closing the opening; a drive member swingably supported for driving the blade; a drive spring for driving the drive member; and an adjustment mechanism for adjusting an urging force of the drive spring. One end of the drive spring is engaged with the drive member. The adjustment mechanism includes: an adjustment member engaging the other end of the drive spring and rotatably supported to adjust the urging force of the drive spring; and an engagement member abutting the adjustment member to stop rotation of the adjustment member. The adjustment member has a clearance portion for avoiding abutment against the engagement member at a given rotational position.

4 Claims, 7 Drawing Sheets

OBJECT SIDE

IMAGE SIDE

FOCAL PLANE SHUTTER

CROSS-REFERENCE TO RELATED APPLICATION

This application is a continuation of and claims priority to International Patent Application No. PCT/JP2008/066540 filed on Sep. 12, 2008, which claims priority to Japanese Patent Application No. 2007-293758 filed on Nov. 12, 2007, subject matter of these patent documents is incorporated by reference herein in its entirety.

BACKGROUND OF THE INVENTION

1. Field of the Invention

The present invention relates to focal plane shutters.

2. Description of the Related Art

Conventionally, a focal plane shutter includes: leading blades; trailing blades; a driving arm coupled to them, and a drive member coupled to the drive arm (see Japanese Unexamined Patent Application Publication No. 2002-296641). The drive member is swingably supported about a given position. In response to the swinging of the drive member, the drive arm is driven, and then the reading or trailing blades are driven. This drive member (drive lever) is operated by an urging force of a drive spring. One end of the drive spring is engaged with the drive member. Also, the focal plane shutter is provided with an adjustment mechanism for adjusting the urging force of the drive spring. This adjustment mechanism includes: a ratchet wheel that engages the other end of the drive spring; and a ratchet pawl that abuts the ratchet wheel to define a rotational direction and a stop position of the ratchet wheel. The ratchet wheel and the drive spring are concentrically arranged about a given axis. The urging force of the drive spring can be adjusted by the ratchet wheel, and the ratchet pawl can stop the ratchet wheel at a given position. Thus, the shutter speed can be adjusted.

In the assembling processes of the adjustment mechanism as mentioned above, the drive spring is concentrically arranged with a spindle provided to stand on the board, and then the ratchet wheel is arranged above the drive spring. Next, a printed substrate assembled with the ratchet pawl is attached on an upper end portion of the spindle. In this time, since the ratchet pawl is assembled into the ratchet wheel from its upper side in its axis direction, the ratchet pawl and the periphery of the ratchet wheel are abutted in this assembling process. This abutment may cause the ratchet pawl to chip the peripheral surface of the ratchet wheel, and thus the chips may be generated. Such chips adhere to the periphery of a mechanism for driving the leading and trailing blade, thereby influencing the shutter operation. Further, the chips generated in this way may adhere to an inside of the shutter, and are then discharged from the inside of the shutter after the shutter is installed into a camera body, and the chips may adhere to a lens surface or an image pickup element, whereby the image quality may be degraded.

SUMMARY OF THE INVENTION

It is therefore an object of the present invention to provide a focal plane shutter that suppresses a dust from being generated in the assembling process.

According to an aspect of the present invention, there is provided a focal plane shutter including: a shutter substrate having an opening; a blade for opening and closing the opening; a drive member swingably supported for driving the blade; a drive spring for driving the drive member; and an adjustment mechanism for adjusting an urging force of the drive spring. One end of the drive spring is engaged with the drive member, the adjustment mechanism includes an adjustment member engaging the other end of the drive spring and rotatably supported to adjust the urging force of the drive spring, and an engagement member abutting the adjustment member to stop rotation of the adjustment member, and the adjustment member has a clearance portion for avoiding abutment against the engagement member at a given rotational position.

BRIEF DESCRIPTION OF THE DRAWINGS

FIG. 5A illustrates the ratchet wheel and the ratchet pawl according to the present embodiment, and FIG. 5B illustrates the conventional ratchet wheel and the conventional ratchet pawl;

FIG. 6A is a side view of the ratchet wheel and the ratchet pawl according to the present embodiment, and FIG. 6B is a side view of the conventional ratchet wheel and the conventional ratchet pawl.

DESCRIPTION OF THE PREFERRED EMBODIMENT

A description will be given of an embodiment according to the present invention with reference to the drawings.

Figure 1:
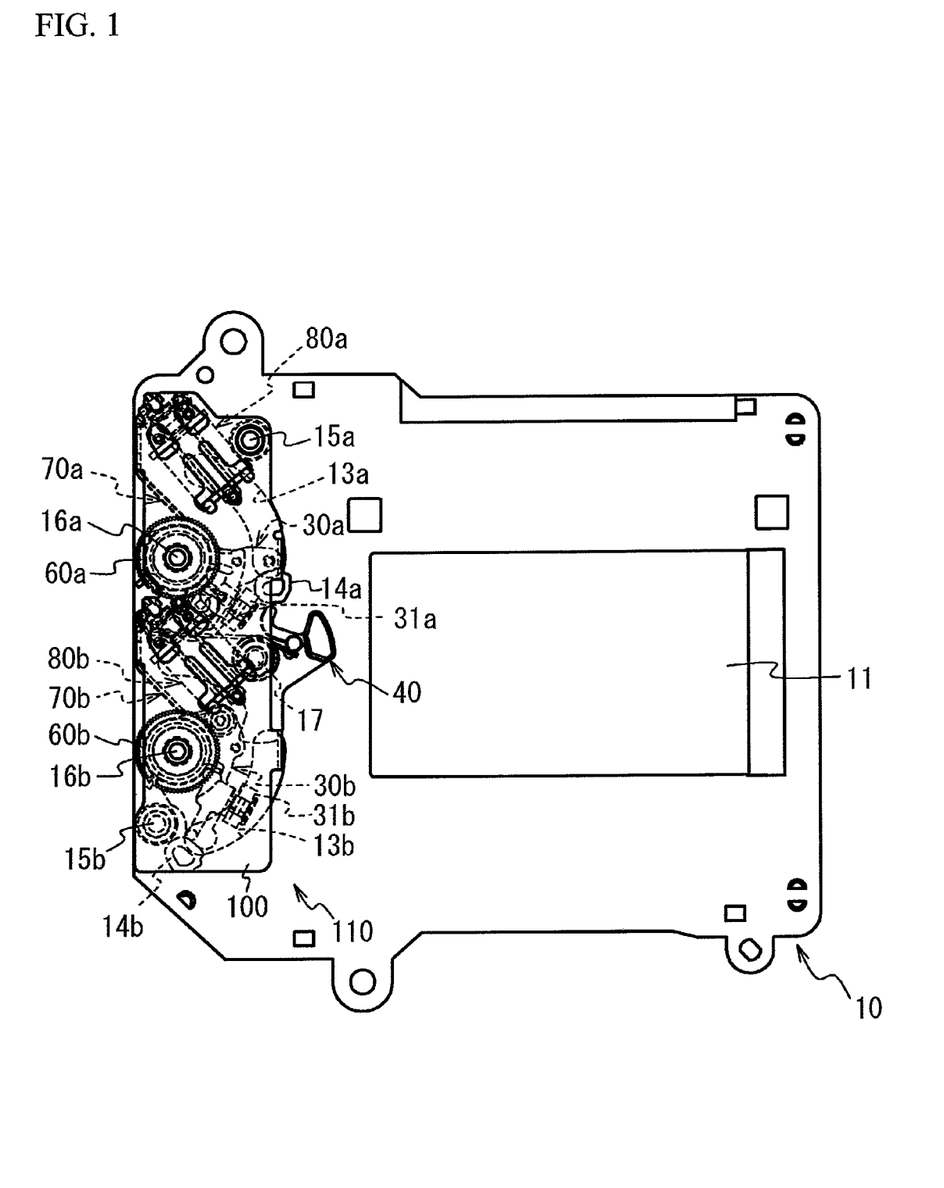
FIG. 1 is a front view of a focal plane shutter according to the present embodiment.
Figure 2:
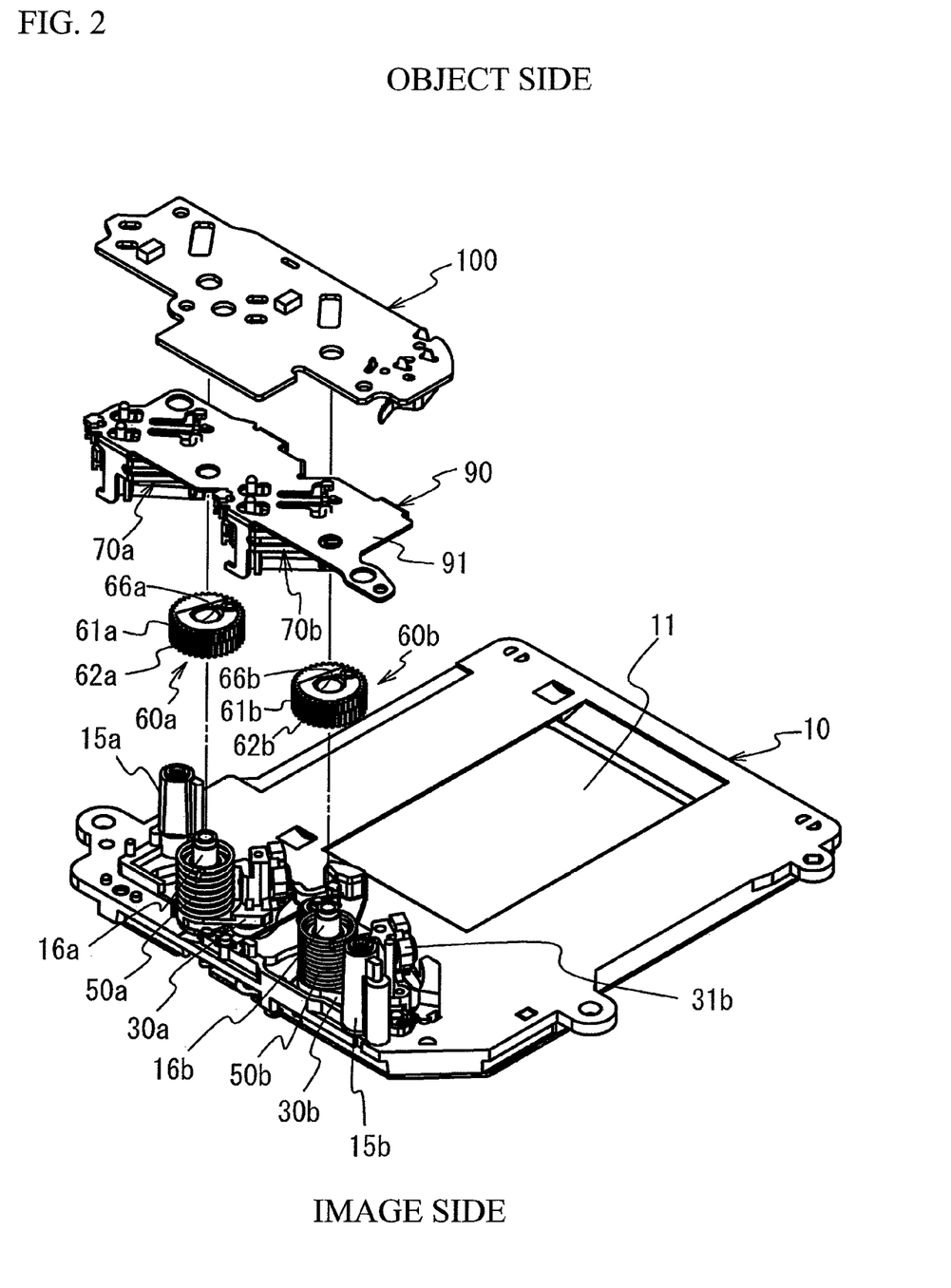
FIG. 2 is an exploded perspective view of the focal plane shutter according to the present embodiment.

FIG. 1 is a front view of a focal plane shutter according to the present embodiment. FIG. 2 is an exploded perspective view of the focal plane shutter according to the present embodiment.

The focal plane shutter includes a shutter substrate 10 and a drive mechanism 110. In the present embodiment as illustrated in FIG. 1, the focal plane shutter is installed in a camera body such that the front side of FIG. 1 is the object side, and the rear side is the image side. An opening 11 having a rectangular shape is formed at a center portion of the shutter substrate 10. The drive mechanism 110 is provided on the object side of the shutter substrate 10 at the left side of the opening 11. The drive mechanism 110, as illustrated in FIG. 2, includes: drive levers 30a and 30b serving as drive members; a set lever 40; drive springs 50a and 50b; ratchet wheels 60a and 60b serving as adjustment members; ratchet pawls 70a and 70b serving as engagement members; an electromagnet unit 90; and a printed substrate 100. The drive lever 30a is coupled to a drive arm (not illustrated) that is coupled to trailing blades (not illustrated) opening and closing the opening 11. The drive lever 30b is coupled to a drive arm (not illustrated) that is coupled to leading blades (not illustrated) opening and closing the opening 11. Additionally, the drive levers 30a and 30b are slidably engaged with spindles 16a and 16b provided to stand on the shutter substrate 10, and are capable of swinging about the spindles 16a and 16b, respectively. Additionally, the drive levers 30a and 30b are provided with iron pieces 31a and 31b, respectively. The iron pieces 31a and 31b are adsorbed by influence of electromagnets 80a and 80b, as will be described in more detail, and this cause the drive levers 30a and 30b to be maintained at initial positions. Additionally, the reading and trailing blades each are composed of plural blades, and are designed to open the opening 11 in an overlapped state and also to close the opening 11 in a spread state.

Additionally, the set lever 40 is swingably supported by a spindle 17 formed on the shutter substrate 10, and is provided for setting the drive levers 30a and 30b at the initial positions. More specifically, a camera body side member, not illustrated, causes the set lever 40 to swing clockwise, thereby causing the set lever 40 to swing the drive levers 30a and 30b counterclockwise. FIG. 1 illustrates a non-set state. By energizing the electromagnets 80a and 80b respectively, the iron pieces 31a and 31b are adsorbed thereto, thereby maintaining the drive levers 30a and 30b at the initial positions. Additionally, when the energization of the electromagnets 80a and 80b is cut, thus the drive levers 30a and 30b are moved to final positions by urging forces of the drive springs 50a and 50b, respectively.

Each of the drive springs 50a and 50b has a coil shape. The drive springs 50a and 50b are concentrically arranged about the spindles 16a and 16b to surround them, respectively. The drive springs 50a and 50b respectively urge the drive levers 30a and 30b clockwise. As will be described later in detail, one ends 51a of the drive springs 50a and 50b are respectively engaged with the drive levers 30a and 30b, and the other ends 52a are respectively engaged with the ratchet wheels 60a and 60b. Additionally, the drive springs 50a and 50b are wound counterclockwise in the extending directions of the spindles 16a and 16b, respectively.

The ratchet wheels 60a and 60b are concentrically arranged about the spindles 16a and 16b, respectively. Further, in the process for assembling the spindles 16a and 16b, the drive springs 50a and 50b are arranged, and then the ratchet wheels 60a and 60b are assembled into the spindles 16a and 16b from their upper sides respectively. At this time, rotation of the ratchet wheels 60a and 60b causes the other ends 52a to be inserted into an engagement portion 64a of the ratchet wheels 60a and 60b, thereby engaging the ratchet wheels 60a and 60b with the drive springs 50a and 50b, respectively. The ratchet wheels 60a and 60b are rotatably supported about the spindles 16a and 16b, respectively. Each of the ratchet wheels 60a and 60b serves as an adjustment member for adjusting the urging force of the drive springs 50a and 50b, respectively. Additionally, upper stage teeth 61a and lower stage teeth 62a are formed at the peripheral surface of the ratchet wheel 60a. The upper and lower stage teeth 61a and 62a are substantially identical in the number of teeth, and are different in the tooth pitch by one-half pitch. Similarly, upper and lower stage teeth 61b and 62b are formed in the ratchet wheel 60b.

The ratchet pawls 70a and 70b serve as engagement members that abut the ratchet wheels 60a and 60b to stop their rotations, respectively. The ratchet pawls 70a and 70b have elastic forces and thin plate shapes. The ratchet pawls 70a and 70b each has its one end with a bifurcated shape, as will be described later in more detail. Also, the ratchet pawls 70a and 70b and the electromagnets 80a and 80b are attached on a support plate 91, such that they are made into a single unit as the electromagnet unit 90, as illustrated in FIG. 2. The electromagnet unit 90 is assembled on the shutter substrate 10, after the drive levers 30a and 30b, the set lever 40, the drive springs 50a and 50b, and the ratchet wheels 60a and 60b are assembled on the shutter substrate 10. The electromagnet unit 90 is provided with fitting holes which are respectively fitted onto spindles 15a and 15b. The printed substrate 100 is mounted on the object side surface of the electromagnet unit 90. The printed substrate 100 is mounted on the object side of the support plate 91, after the electromagnet unit 90 is assembled on the shutter substrate 10.

Figure 3:
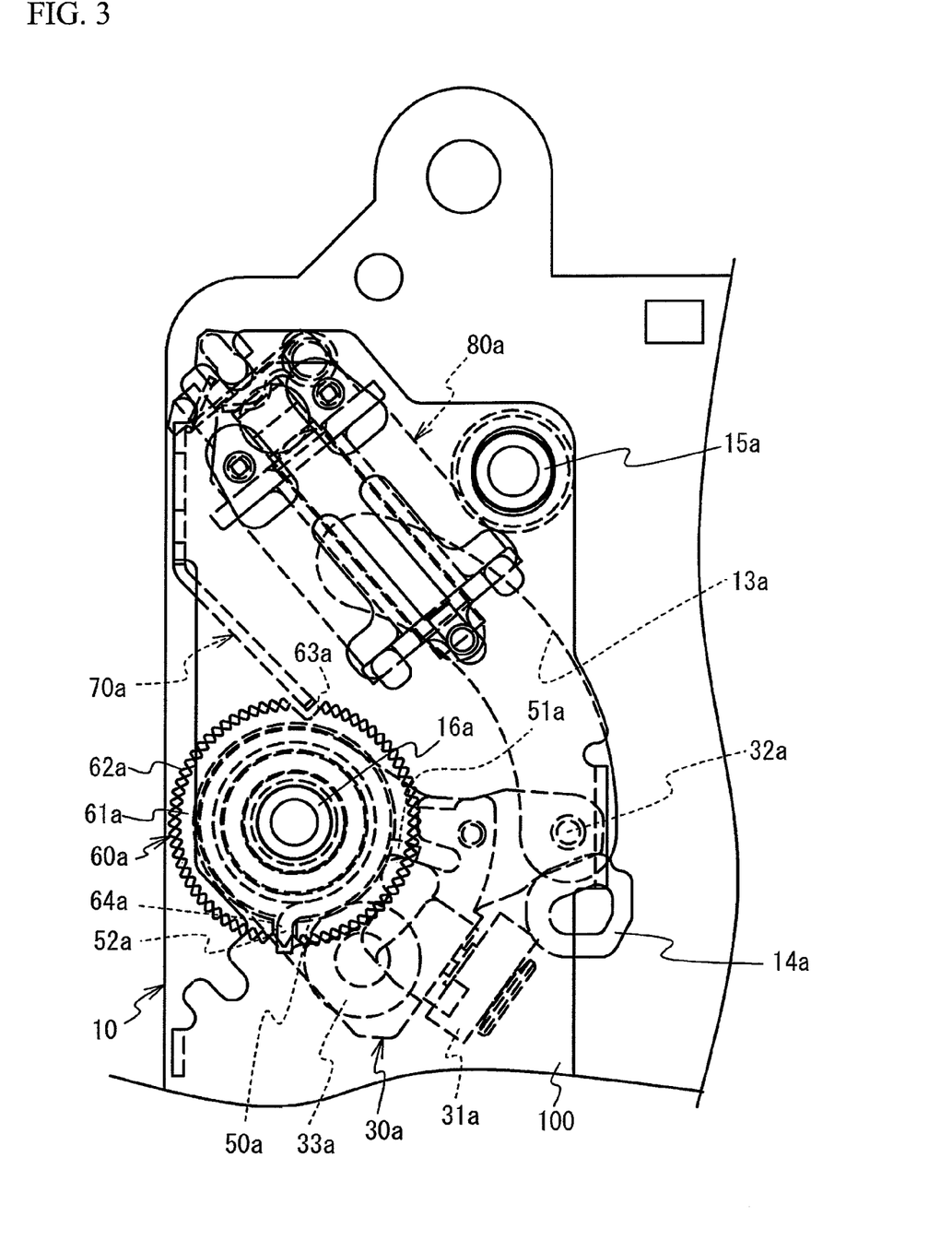
FIG. 3 is an enlarged view of a drive lever and its vicinity.

Next, a description will be given of a configuration of the drive lever 30a and its vicinity. FIG. 3 is an enlarged view of the drive lever 30a and its vicinity. The drive lever 30a is provided with a drive pin 32a, which extends from the reverse surface of the drive lever 30a to the image side, at its end portion far from the center of swing. The drive pin 32a is moved in an arc by swinging the drive lever 30a. The shutter substrate 10 is provided with a receiving hole 13a for receiving the movement of the drive pin 32a. The receiving hole 13a has a semicircular arc shape. The receiving hole 13a is coupled to the drive arm which is coupled to the trailing blades. By swinging the drive pin 32a, the trailing blades are shifted between the spread state, in which the opening 11 is closed, and the overlapped state, in which the opening 11 is opened. Further, the drive lever 30a has a following roller 33a which is pushed by the set lever 40. When the set lever 40 swings clockwise from the state as illustrated in FIG. 1, a part of the set lever 40 pushes the following roller 33a. This causes the drive lever 30a to swing counterclockwise. Therefore, the drive lever 30a moves to the initial position. Further, the drive lever 30a is maintained at the initial position, since the iron piece 31a is adsorbed by the effect of the electromagnet 80a.

As mentioned above, since the drive lever 30a is engaged with one end 51a of the drive spring 50a, the swinging of the drive lever 30a counterclockwise causes one end 51a to rotate counterclockwise with the other end 52a of the drive spring 50a fixed. Therefore, the drive lever 30a is positioned at the initial position against the urging force of the drive spring 50a. When the energization of the electromagnet 80a is cut with the drive lever 30a maintained at the initial position, the electromagnet 80a lacks the adsorptive force for the iron piece 31a, and then the drive lever 30a is moved to the final position by the urging force of the drive spring 50a. At an end portion of the receiving hole 13a, a rubber member 14a is provided for suppressing bounding of the drive lever 30a moved to the final position.

Additionally, the drive lever 30b and the like are arranged similarly. As illustrated in FIG. 1, the shutter substrate 10 is provided with a receiving hole 13b for receiving a drive pin of the drive lever 30b, and a rubber member 14b for suppressing the drive lever 30b from bounding. Further, the drive lever 30b is also attached with the iron piece 31b. In addition, in FIG. 3, an end of ratchet pawl 70a does not abut the ratchet wheel 60a, whereas the ratchet pawl 70a abuts the peripheral surface of the ratchet wheel 60a in a normal state, so that the rotation of the ratchet wheel 60a due to the urging force of the drive spring 50a is suppressed. This will be described later in more detail.

Next, a description will be given of a method for adjusting the urging force of the drive spring 50a. With respect to shutters while they are manufactured, the drive speed of the drive parts have variations caused by accuracies of parts such as springs. The adjusting of the urging force is needed for elimination of the variations. The other end 52a is engaged with the engagement portion 64a, when the ratchet wheel 60a is rotated clockwise from the state illustrated in FIG. 3. Accordingly, the other end 52a of the drive spring 50a is twisted clockwise. By rotating the ratchet wheel 60a clockwise from the state illustrated in FIG. 3, the drive spring 50a applies the urging force to the ratchet wheel 60a in the counterclockwise direction. However, the end portion of the ratchet pawl 70a is engaged with either the upper stage teeth 61a or the lower stage teeth 62a, so that the ratchet wheel 60a is not rotated counterclockwise and maintained in a stop position. In this manner, by rotating the ratchet wheel 60a clockwise, the urging force of the drive spring 50a can be strengthened. Additionally, in order to weaken the urging force of the drive spring 50a once strengthened, the ratchet pawl 70a is disengaged with the upper stage teeth 61a or the lower stage teeth 62a by use of a jig or the like. Thus, the ratchet wheel 60a is rotated counterclockwise to return to the initial state in the assembling by the urging force of the drive spring 50a. As mentioned above, the ratchet wheel 60a and the ratchet pawl 70a serve as an adjustment mechanism for adjusting the urging force of the drive spring 50a. Additionally, the drive spring 50b, the ratchet wheel 60b, and the ratchet pawl 70b have the same configuration.

Figure 4:
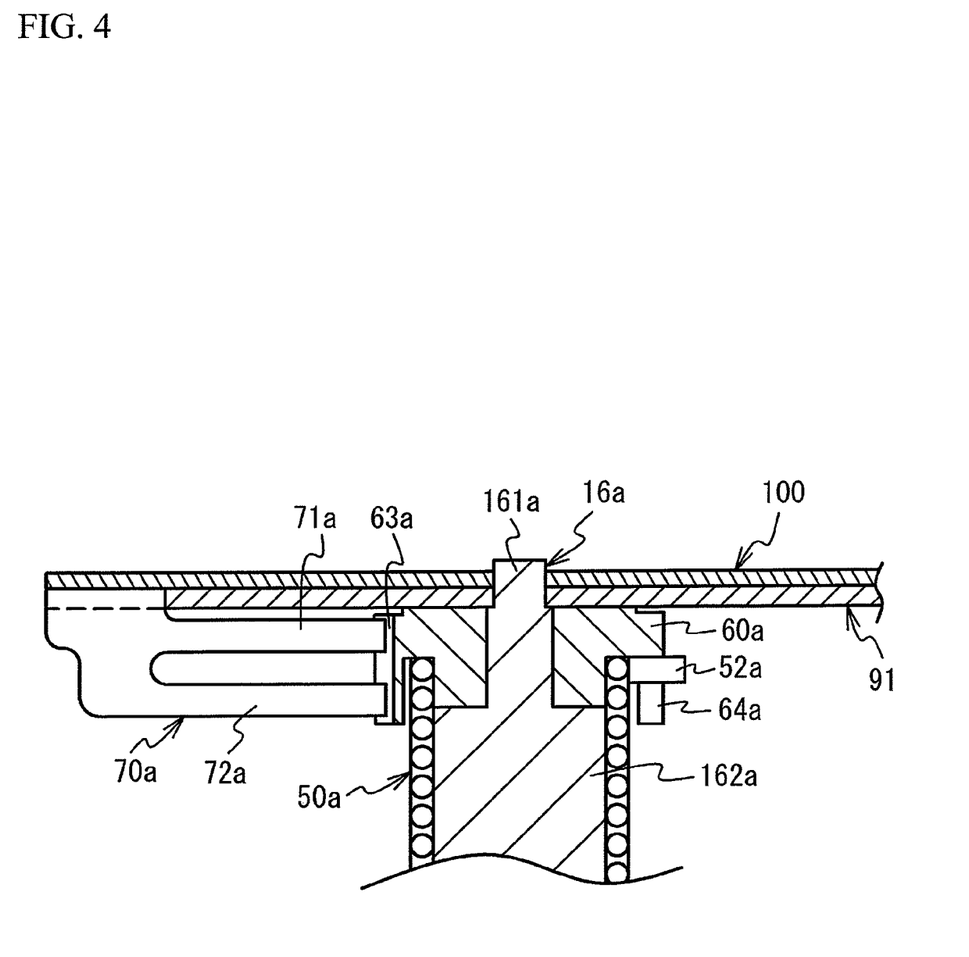
FIG. 4 is a vertical cross-sectional view of a ratchet wheel and its vicinity.

Next, a description will be given of the ratchet wheel 60a in more detail with reference to FIGS. 3 and 4. FIG. 4 is a vertical cross-sectional view of the ratchet wheel 60a and its vicinity. Further, FIGS. 3 and 4 illustrate the state where the drive spring 50a, and the ratchet wheel 60a are assembled on the shutter substrate 10 and the electromagnet unit 90 and the printed substrate 100 are further assembled on the shutter substrate 10. As illustrated in FIG. 4, the ratchet pawl 70a has an upper stage pawl 71a and a lower stage pawl 72a. The upper and lower stage pawls 71a and 72a are capable of abutting the upper and lower stage teeth 61a and 62a, respectively. Further, since the upper and lower stage teeth 61a and 62a are different in tooth pitch by one-half pitch as mentioned above, the ratchet wheel 60a is engaged to stop its rotation in the state where either the upper stage pawl 71a abuts the upper stage teeth 61a or the lower stage pawl 72a abuts the lower stage teeth 62a.

As illustrated in FIGS. 3 and 4, a clearance portion 63a is formed on the peripheral surface of the ratchet wheel 60a facing the end portions of the upper stage pawl 71a and the lower stage pawl 72a, such that the clearance portion 63a has a recess shape extending in the axis direction. Further, the engagement portion 64a is formed at an opposite side of the clearance portion 63a with respect to the center of the ratchet wheel 60a. The engagement portion 64a is engaged with the other end 52a of the drive spring 50a. The engagement portion 64a has a cutout shape extending in the axis direction so as to make the inner side of the ratchet wheel 60a housing the drive spring 50a communicate with the outer side of the ratchet wheel 60a. Additionally, as illustrated in FIG. 4, a small diameter portion 161a is formed at an end portion side of the spindle 16a, and a large diameter portion 162a is formed at the shutter substrate 10 side of the spindle 16a. The ratchet wheel 60a is positioned in the axis direction by the support plate 91 fitted onto the small diameter portion 161a, and the larger diameter portion 162a. The small diameter portion 161a is slidably fitted into a hole 66a of the ratchet wheel 60a. Further, the ratchet wheel 60a is rotatably supported on an end surface of the larger diameter portion 162a.

Figure 5A:
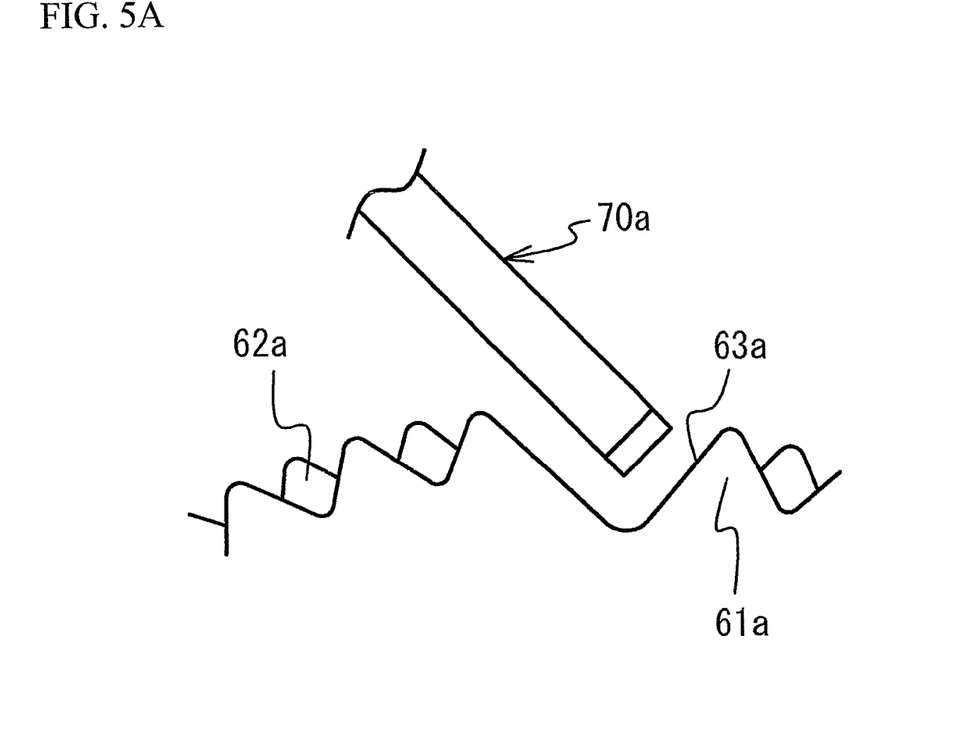
FIGS. 5A and 5B are enlarged views for comparing ratchet wheels and ratchet pawls in the focal plane shutter according to the present embodiment and those in a conventional type.
Figure 5B:
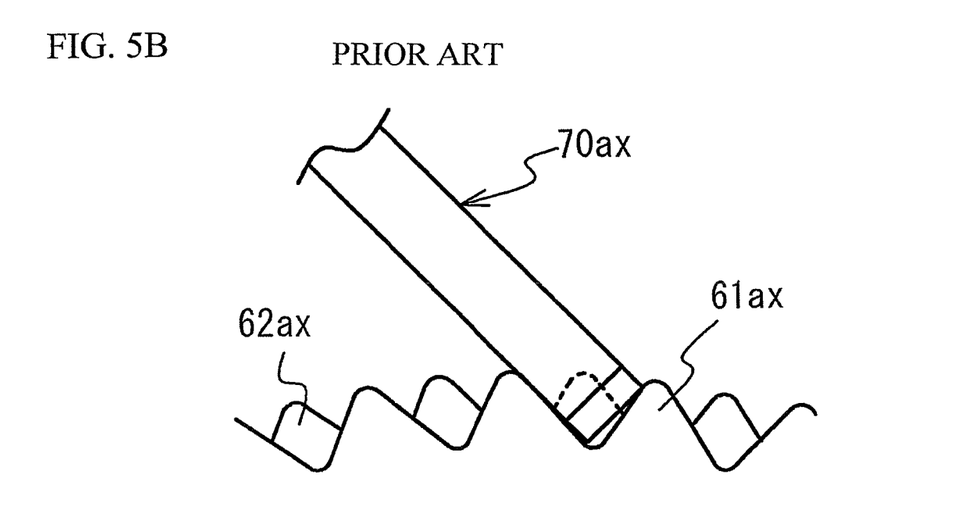
Figure 6A:
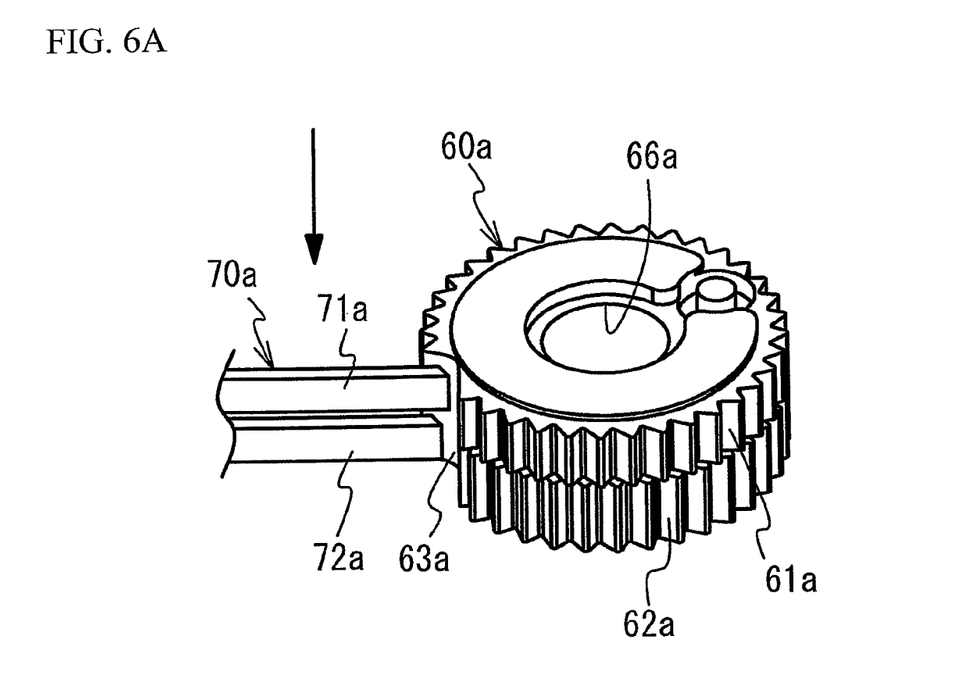
FIGS. 6A and 6B are side views for comparing the ratchet wheels and the ratchet pawls in the focal plane shutter according to the present embodiment and the conventional one.
Figure 6B:
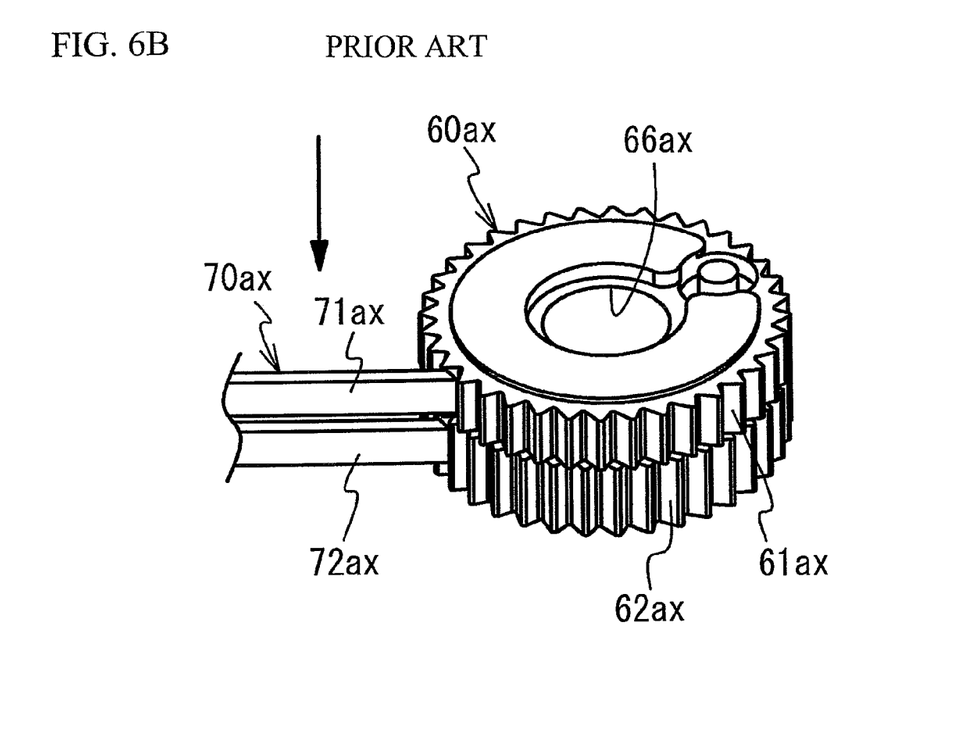

Next, a description will be given of the clearance portion 63a in more detail. FIGS. 5A and 5B are enlarged views for comparing the ratchet wheels and the ratchet pawls in the focal plane shutter according to the present embodiment and those in a conventional type. FIG. 5A illustrates the ratchet wheel and the ratchet pawl according to the present embodiment, and FIG. 5B illustrates the conventional ratchet wheel and the conventional ratchet pawl. Further, FIG. 5A is an enlarged view of the clearance portion 63a and its vicinity as illustrated FIG. 3, and FIG. 5B corresponds to FIG. 5A. FIGS. 6A and 6B are side views for comparing the ratchet wheels and the ratchet pawls in the focal plane shutter according to the present embodiment and the conventional one. FIG. 6A is a side view of the ratchet wheel and the ratchet pawl according to the present embodiment, and FIG. 6B is a side view of the conventional ratchet wheel and the conventional ratchet pawl. Further, FIGS. 5A, 5B, 6A and 6B illustrate the state where the urging force of the drive spring is not adjusted by the ratchet wheel after the assembling is accomplished. Furthermore, in the configuration of the conventional focal plane shutter, similar components of the present embodiment are applied to similar reference numerals to avoid a duplicated explanation.

As mentioned above, the focal plane shutter is assembled as follows. Firstly, the drive levers 30a and 30b are assembled on the shutter substrate 10, and then the drive springs 50a and 50b engaging one ends of the drive levers 30a and 30b are assembled on the shutter substrate 10. Next, the ratchet wheels 60a and 60b are rotated to engage the other ends of the drive springs 50a and 50b and are assembled on the shutter substrate 10, respectively. Next, the ratchet pawls 70a and 70b are assembled on the shutter substrate 10. In this time, after the ratchet wheel 60a is arranged on the spindle 16a, the ratchet pawl 70a is assembled such a manner to move in the axis direction from the object side to the image side, and the ends of the upper and lower stages pawls 71a and 72a are assembled to respectively face the upper and lower stage teeth 61a and 62a. The ratchet pawls 70a and 70ax are moved from the upside to the downside in FIGS. 6A and 6B.

As illustrated in FIGS. 5B and 6B, a recess portion like the clearance portion 63a is not formed on the peripheral surface of the conventional ratchet wheel 60ax. Further, the ratchet pawl 70ax abuts any one of the upper and lower stage teeth 61ax and 62ax to engages the ratchet wheel 60ax to stop its rotation. Thus, the ratchet pawl 70ax is typically assembled in such a position to abut the ratchet wheel 60ax. In this assembling process, the ratchet pawl 70ax is downwardly pushed to a given position in the axis direction in the assembling, as mentioned above. For this reason, the ends of the upper and lower stage pawls 71ax and 72ax may abut and chip the peripheral surface of the ratchet wheel 60ax. In particular, in the cases where teeth portions are composed of two teeth portion of upper and lower stage as described in the present embodiment, any one of the teeth portions may dash and greatly chip the latchet pawl. When the peripheral surface of the 60ax is chipped, the chipped resin powders become dusts and may adhere to the inside of the shutter mechanism. When the dust adheres to the inside of the shutter mechanism, the shutter operation may be adversely affected. Moreover, after the assembled shutter is installed in a camera body or the like, the dust may be discharged from the inside of the shutter and then adhere to the image pickup element or the lens surface. In this case, the image quality is degraded.

However, in the focal plane shutter according to the present embodiment, the clearance portion 63a is formed on the peripheral side surface of the ratchet wheel 60a in such a position to face the upper and lower stage pawls 71a and 72a, as illustrated in FIGS. 5A and 6A. This avoids abutment of the peripheral surface of the ratchet wheel 60a with the ends of the upper stage pawls 71a and 72a. Accordingly, the generating of the dust in the conventional case can be suppressed in the assembling process.

Next, a description will be given of a position where the clearance portion 63a should be formed relative to the ratchet wheel 60a. The ratchet wheel 60a is provided with the engagement portion 64a engaging the other end 52a, as mentioned above. In the assembling process, the drive spring 50a and the drive lever 30a are assembled on the shutter substrate 10 with the drive spring 50a being in a natural state (non-loaded state) and with the drive lever 30a engaging one end 51a. Since the drive springs have the same shapes, the position of the other end 52a comes to a fixed position in the assembling process. Therefore, when the other end 52a is engaged with the engagement portion 64a, the ratchet wheel 60a is assembled on the shutter substrate 10 and positioned at a given position in the rotational direction. This defines the position where the end portions of the upper and lower stage pawls 71a and 72a face the peripheral surface of the ratchet wheel 60a, and thus this position is set to form the clearance portion 63a. Consequently, in the assembling of the ratchet pawl 70a, it is possible to avoid the abutment of the end portions of the upper and lower stage pawls 71a and 72a with the ratchet wheel 60a.

Figure 7:
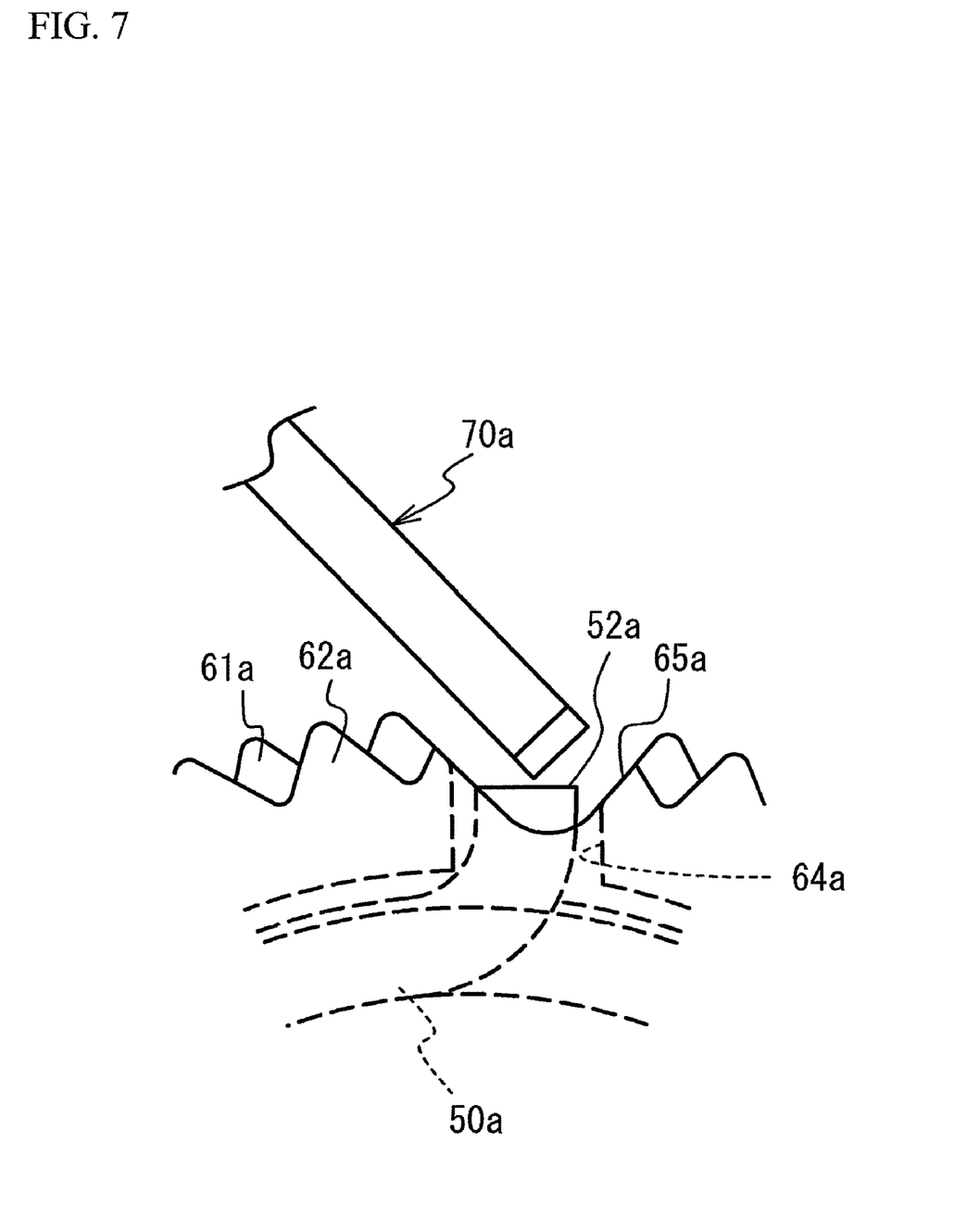
FIG. 7 is an enlarged view of a ratchet wheel and a ratchet pawl of the focal plane shutter according to a variation.

Next, a description will be given of a variation of the focal plane shutter. In the variation of the focal plane shutter, the same components have the same reference numerals in order to avoid a duplicated explanation. FIG. 7 is an enlarged view of a ratchet wheel and a ratchet pawl of the focal plane shutter according to the variation. In addition, FIG. 7 corresponds to FIG. 5A.

Referring to FIG. 7, a clearance portion 65a, and the engagement portion 64a engaging the other end 52a, are formed in the same position of the peripheral surface of the ratchet wheel 60a. With such a configuration, the clearance portion 65a also functions as the engagement portion 64a for engaging the other end 52a. That is, the clearance portion 65a is provided for avoiding the abutment of the end portion of the ratchet pawl 70a, and is also provided for engaging the other end 52a. In the present embodiment, the engagement portion 64a, which communicates the inside with the outside, has two-thirds length of the ratchet wheel 60a in its axial direction from its bottom, in order to maintain the strength of the ratchet wheel 60a. Specially, in the clearance portion 65a, one-thirds of the upper side of the ratchet wheel 60a serve as the clearance portion for avoiding the abutment of the end portion of the ratchet pawl 70a, and the remaining two-thirds serve as the engagement portion 64a and also serve as the clearance portion. Providing that the strength is ensured, the clearance portion 65a may be formed in a cutout shape to cause the inside of the ratchet wheel 60a to communicate with the outside thereof and extend in the axial direction of the ratchet wheel 60a. With such a configuration, the generation of the dust can be suppressed as mentioned above and the engagement of the other end 52a of the drive spring 50a can be ensured with a simple structure.

Additionally, in order to employ the ratchet wheel 60a which is provided with the clearance portion 65a, it is required to design an arrangement that the other end 52a faces the end portions of the upper and lower stage pawls 71a and 72a with the drive spring 50a naturally assembled with the drive lever 30a and on the shutter substrate 10.

While the preferred embodiments of the present invention have been illustrated in detail, the present invention is not limited to the above-mentioned embodiments, and other embodiments, variations and modifications may be made without departing from the scope of the present invention.

For example, the ratchet wheel is arranged on the object side in the focal plane shutter according to the present embodiment. However, the ratchet wheel may be arranged on the image side.

Finally, several aspects of the present invention are summarized as follows.

According to an aspect of the present invention, there is provided a focal plane shutter including: a shutter substrate having an opening; a blade for opening and closing the opening; a drive member swingably supported for driving the blade; a drive spring for driving the drive member; and an adjustment mechanism for adjusting an urging force of the drive spring. One end of the drive spring is engaged with the drive member, the adjustment mechanism includes an adjustment member engaging the other end of the drive spring and rotatably supported to adjust the urging force of the drive spring, and an engagement member abutting the adjustment member to stop rotation of the adjustment member, and the adjustment member has a clearance portion for avoiding abutment against the engagement member at a given rotational position.

In the above configuration, the drive member may be assembled on the shutter substrate, the drive spring may be assembled on the shutter substrate such that one end of the drive spring engages the drive member, the adjustment member may be assembled on the shutter substrate such that the other end of the drive spring engages the adjustment member, and the engagement member may be assembled on the shutter substrate, in this order, and the adjustment member may be formed with the clearance portion in such a position to face the engagement member at a time when the engagement member is assembled on the shutter substrate.

Since the adjustment member is formed with the clearance portion for avoiding abutment with the engagement member, the chipping of the adjustment member by abutment against the engagement member is prevented in the process for assembling the adjustment member and the engagement member. This prevents the generation of dusts at the time of assembling.

Further, the adjustment member is formed with two stages composed of the first teeth portion and the second teeth portion, which are different in the tooth pitch by one-half pitch at the peripheral surface of the adjust member. This type of the adjustment member may be chipped by abutment at the time when the engagement member is assembled. However, the provision of the clearance portion prevents the chipping of the adjustment member.

In the above configuration, the clearance portion may have a cutout shape so as to avoid abutment of the engagement member and so as to be capable of engaging the other end of the drive spring.

With such a configuration, the engagement with the engagement member can be avoided and the other end of the drive spring can be engaged with simple structure.

In the above configuration, the adjustment member may have a teeth portion at its peripheral surface, the engagement member may have a pawl portion engaging the teeth portion; and the clearance portion may be formed at the peripheral surface of the adjustment member to avoid abutment of the pawl portion.

What is claimed is:

1. A focal plane shutter comprising:
a shutter substrate having an opening;
a blade for opening and closing the opening;
a drive member swingably supported for driving the blade;
a drive spring for driving the drive member; and
an adjustment mechanism for adjusting an urging force of the drive spring,
wherein:
one end of the drive spring is engaged with the drive member,
the adjustment mechanism includes an adjustment member engaging the other end of the drive spring and rotatably supported to adjust the urging force of the drive spring, and an engagement member abutting the adjustment member to stop rotation of the adjustment member, the adjustment member has a clearance portion for avoiding abutment against the engagement member at a given rotational position, and the clearance portion has a cutout shape so as to avoid abutment of the engagement member and so as to be capable of engaging the other the drive spring.

2. The focal plane shutter of claim 1, wherein:

the drive member is assembled on the shutter substrate, the drive spring is assembled on the shutter substrate such that one end of the drive spring engages the drive member, the adjustment member is assembled on the shutter substrate such that the other end of the drive spring engages the adjustment member, and the engagement member is assembled on the shutter substrate, in this order, and the adjustment member is formed with the clearance portion in such a position to face the engagement member at a time when the engagement member is assembled on the shutter substrate.

3. The focal plane shutter of claim 1, wherein the adjustment member is formed at its peripheral surface with a first teeth portion and a second teeth portion being different in a tooth pitch by one-half pitch.

4. The focal plane shutter of claim 1, wherein:

the adjustment member has a teeth portion at its peripheral surface the engagement member has a pawl portion engaging the teeth portion, and the clearance portion is formed at the peripheral surface of the adjustment member to avoid abutment of the pawl portion.

* * * * *